(12) United States Patent
Seack et al.

(10) Patent No.: US 12,377,957 B2
(45) Date of Patent: Aug. 5, 2025

(54) LOAD INTRODUCTION SYSTEM AND METHOD FOR MANUFACTURING A LOAD INTRODUCTION SYSTEM

(71) Applicant: Airbus Operations GmbH, Hamburg (DE)

(72) Inventors: Oliver Seack, Hamburg (DE); Kathrin Stubbe, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 18/537,072

(22) Filed: Dec. 12, 2023

(65) Prior Publication Data
US 2024/0199194 A1 Jun. 20, 2024

(30) Foreign Application Priority Data
Dec. 14, 2022 (EP) .................................. 22213593

(51) Int. Cl.
*B64C 9/02* (2006.01)
*B64C 9/16* (2006.01)

(52) U.S. Cl.
CPC . *B64C 9/02* (2013.01); *B64C 9/16* (2013.01)

(58) Field of Classification Search
CPC .... B64C 9/02; B64C 9/16; B64C 9/18; B64C 3/50
See application file for complete search history.

(56) References Cited

U.S. PATENT DOCUMENTS

| 10,494,083 | B2 * | 12/2019 | Currie | B64C 3/50 |
| 11,933,353 | B2 * | 3/2024 | Smeal | B64C 9/16 |
| 2015/0329197 | A1 | 11/2015 | Seack et al. | |
| 2018/0141636 | A1 | 5/2018 | Currie et al. | |
| 2022/0185449 | A1 | 6/2022 | Glassmoyer et al. | |
| 2022/0299063 | A1 | 9/2022 | Smeal et al. | |
| 2024/0174351 | A1 * | 5/2024 | Kelly | B64C 3/28 |

FOREIGN PATENT DOCUMENTS

| EP | 2578489 A2 | 4/2013 |
| EP | 3323712 A1 | 5/2018 |
| EP | 3575206 A1 | 12/2019 |
| EP | 4059835 A1 | 9/2022 |

OTHER PUBLICATIONS

European Search Report for corresponding European Patent Application No. 22213593 dated May 15, 2023; priority document.

* cited by examiner

*Primary Examiner* — Arfan Y. Sinaki
(74) *Attorney, Agent, or Firm* — Greer, Burns & Crain, Ltd.

(57) ABSTRACT

A load introduction system comprising an aerodynamic component and an attachment unit. The attachment unit comprises a first and a second attachment element, each of the first and the second attachment element having a mounting interface that mounts the attachment unit to a skin section and to a protrusion of the aerodynamic component. The first and the second attachment element are in contact with each other via respective contact surfaces and both attachment elements have a first opening for receiving a coupling mechanism of a base unit. The first openings coaxially align with each other and cooperatively receive the coupling mechanism. Also a method for manufacturing a load introduction system.

15 Claims, 4 Drawing Sheets

LOAD INTRODUCTION SYSTEM AND METHOD FOR MANUFACTURING A LOAD INTRODUCTION SYSTEM

CROSS-REFERENCES TO RELATED APPLICATIONS

This application claims the benefit of European Patent Application Number 22213593.1 filed on Dec. 14, 2022, the entire disclosure of which is incorporated herein by way of reference.

FIELD OF THE INVENTION

The invention relates to improved attachment and load transmission concepts for aerodynamic structures. In particular, the invention relates to a load introduction system and a method for manufacturing a load introduction system.

BACKGROUND OF THE INVENTION

The transmission of loads among components of aerodynamic systems is an important aspect that has to be considered during the design process of such systems. For example, strength requirements, low manufacturing/assembly costs in combination with a reliable and stable manufacturing/assembly process are important aspects that have to be dealt with during the design process. When designing the corresponding components, load paths through these components can be analyzed and optimized so as to avoid load peaks in certain regions within the component structure. Such load peaks often occur at fastening elements like bolts which couple the components to each other. In particular, high tension forces may occur inside the bolts when coupling the components to each other.

EP 3 575 206 A1 describes a system for driving a flap arrangement between a retracted position and an extended position, a wing having such a system as well as an aircraft.

EP 2 578 489 A2 describes a flap support structure for an aircraft wing having a trailing edge flap. The flap support structure comprises a flap support beam including an aerodynamic fairing and a drive unit including a universal support structure which rotatably receives a drive shaft connected to a drive arm for moving the trailing edge flap. The universal support structure also forms part of the flap support beam and supports the aerodynamic fairing.

SUMMARY OF THE INVENTION

It may be seen as an object of the invention to improve the load transmission within an attachment unit for aerodynamic structures.

A system and a method for load transmission. Further embodiments of the invention are evident from the following description.

According to an aspect of the invention, a load introduction system is provided. The load introduction system comprises an aerodynamic component having a skin section with an aerodynamic outer surface and a protrusion extending from the aerodynamic outer surface of the skin section. The load introduction system further comprises an attachment unit for movably coupling the aerodynamic component to a base unit. The attachment unit comprises a first attachment element and a second attachment element, each of the first attachment element and the second attachment element having a mounting interface that is configured to mount the attachment unit to the skin section and to the protrusion of the aerodynamic component. Furthermore, each of the first attachment element and second attachment element has a contact surface, wherein the contact surface of the first attachment element and the contact surface of the second attachment element are in contact with each other, e.g., are pressed against each other, in an assembled state of the attachment unit. Each of the first attachment element and the second attachment element has a first opening for receiving a coupling mechanism of the base unit. In the assembled state of the attachment unit, the first opening of the first attachment element and the first opening of the second attachment element coaxially align with each other, such that the first opening of the first attachment element and the first opening of the second attachment element cooperatively receive the coupling mechanism of the base unit.

The inventive load introduction system provides an attachment of the aerodynamic component to the base system while providing two independent load paths through the attachment. In particular, a doubling of a load path that extends through the attachment unit is achieved, thereby improving the redundancy of a load transmission between the aerodynamic component and the base system. For the inventive concept, a first load path between the aerodynamic component and the base system will extend through the first attachment element, and a second load path between the aerodynamic component and the base system will extend through the second attachment element.

In an example, both load paths are independent from each other and do not affect each other, such that the load transmission through the first attachment element and between the aerodynamic component and the base system will not influence the load transmission within the second attachment element.

The inventive load introduction system may be part of an aircraft system. For example, the load introduction system is a mechanical device which is configured to mount aerodynamic components, in particular movables like flaps, slats, leading edge high lift devices, ailerons, spoilers, flaperons, vertical and horizontal stabilizers, elevators, rudders or doors to a corresponding base system.

In the following, the load introduction system will be mainly described as being used for the attachment and load transmission of an aircraft flap to an aircraft wing. However, it should be understood that the load introduction system can also be used for other technical applications or for attaching any other of the above-mentioned exemplary aerodynamic components.

The aerodynamic component may comprise an integrally manufactured single-piece structure. For example, the aerodynamic component may comprise or consist of a carbon fiber reinforced plastic (CFRP) material. In particular, if the aerodynamic component is a flap component, it may be designed to form a multi-cell flap design. As will be explained below, such a flap design for the aerodynamic component may additionally include one or more load introduction protrusions, for example fin-like protrusions, extending from the outer surface of the aerodynamic component. Such protrusions may also be made of CFRP material and/or may act as load introduction features on the aerodynamic component which at least partly receive the load transmission from the attachment unit.

The attachment unit which, in the assembled state, comprises the first attachment element and the second attachment element being mounted to each other may be a bracket or bracket-like structure. In particular, the attachment unit may be mounted at one or more connecting regions onto the outer surface of the aerodynamic component.

The first attachment element has its own mounting interface that mounts the first attachment element to the aerodynamic component, in particular to the skin section and to the protrusion of the aerodynamic component. The mounting interface may comprise additional fastening elements, like rivets, screws or bolts, to mount the first attachment element to the outer surface and protrusion of the aerodynamic component. Analogously, the second attachment element has its own mounting interface that mounts the second attachment element to the aerodynamic component, in particular to the skin section and to the protrusion of the aerodynamic component. The mounting interface may comprise additional fastening elements, like rivets, screws or bolts, to mount the second attachment element to the outer surface and protrusion of the aerodynamic component. It is possible, that the mounting interfaces of the first and second attachment element each comprise a form fit connection or a material bond, like a weld joint or adhesive joint etc., to couple the respective attachment element to the aerodynamic component.

The first attachment element has a contact surface which may be present in the form of an entirely flat surface. Analogously, the second attachment element has a contact surface which may also be present in the form of an entirely flat surface. Both contact surfaces are in contact with each other, e.g., with their entire flat surfaces, when the attachment unit is in the assembled state. In particular, fastening elements can be used to fasten both attachment elements to each other, thereby pressing the respective contact surfaces against each other.

The first and second attachment elements may be milled parts which are assembled to each other. For example, the attachment elements may be metal parts. However, it is possible that the attachment elements comprise or consist of other materials, like for instance fiber reinforced materials, etc.

Both the first attachment element and the second attachment element have a first opening, herein also referred to as a lug, for receiving a coupling mechanism of the base unit. The first opening of the first attachment element may be a hole or bore that extends through the first attachment element. In an example, the first opening of the first attachment element may extend through the contact surface of the first attachment element. The first opening of the second attachment unit may, as well, be a hole or bore that extends through the second attachment element. In an example, the first opening of the second attachment unit may extend through the contact surface of the second attachment element.

Both first openings coaxially align with each other in the assembled state of the attachment unit. In addition, both openings be arranged directly adjacent to each other in the assembled state, i.e., with no axial distance to each other. As the first openings may have the same size, in particular the same diameter, they appear as a single opening or lug for receiving the coupling mechanism of the base unit, although the respective openings extend within different elements, i.e., within the first attachment element and the second attachment element, respectively.

A main load transmission through the first attachment element may occur within the structure of the first attachment element between the first opening and the mounting interface of the first attachment element. A main load transmission through the second attachment element may occur within the structure of the second attachment element between the first opening and the mounting interface of the second attachment element. The load transmissions may thus be transmitted via the mounting interfaces of the attachment elements and into the skin section and the protrusion since both attachment elements are mounted to the skin section and the protrusion via the respective mounting interfaces.

According to an embodiment, the first attachment element and the second attachment element are separately manufactured parts which are mounted together in the assembled state.

In particular, both attachment elements have no material connection or structural connection between each other that could transfer a load between the attachment elements. However, it is noted that both attachment elements may be fastened to each other via separate fastening elements that fix the attachment elements to each other, via which a minor load transfer between the attachment elements might occur. Nevertheless, both attachment elements may be designed such that the main load transmission between the respective first openings and the respective mounting interfaces extends solely through the material or structure of the attachment elements themselves. The inventive design of the attachment unit may provide that these main load transmissions do not influence each other or interfere with each other.

According to an embodiment, the first attachment element is configured to provide a first load path from the first opening of the first attachment element to the mounting interface of the first attachment element, wherein the second attachment element is configured to provide a second load path from the first opening of the second attachment element to the mounting interface of the second attachment element, and wherein the first load path is independent from the second load path.

The first and second load paths may correspond to the above-mentioned main load transmissions that extend only through the structure of the respective attachment elements. The term "independent" may in this case be understood in that the load transmissions along these load paths do not influence each other. That is, the main load transmission along the first load path through the structure of the first attachment element does not interfere with or affect the main load transmission along the second load path through the structure of the second attachment element, and vice versa.

According to an embodiment, the first opening of the first attachment element and the first opening of the second attachment element together accommodate a bearing element for receiving the coupling mechanism of the base unit.

The bearing element may be a spherical bearing that movably, e.g., rotatably, couples the coupling mechanism of the base unit to the attachment unit. The spherical bearing may be a separate element that is inserted into the first openings after the first and second attachment elements have been mounted and fixed to each other.

According to an embodiment, the first attachment element is mounted to the second attachment element via at least one fastening element, in the assembled state of the attachment unit.

For example, bolts, rivets, screws etc. can be used to mount or fix the first attachment element to the second attachment element. It is possible that the connection between the first attachment element and the second attachment element provided by the at least one fastening element is a releasable connection, and there might not be any material connection between the attachment elements.

According to an embodiment, the first attachment element comprises a second opening and also the second attachment element comprises a second opening, wherein, in the assembled state of the attachment unit, the second opening of the first attachment element and the second opening of the second attachment element are configured to cooperatively receive an actuation mechanism of the base unit.

That is, the attachment unit may be coupled to the base system via two different devices, e.g., linkages. In particular, the attachment unit is coupled to the base unit via the coupling mechanism that is received by the first openings, e.g., within the spherical bearing, and additionally via the actuation mechanism that is received by the second openings. The second openings may define holes or bores extending through respective portions or flanges of the first and second attachment element. As will be described in more detail below, an additional connector may be provided that includes both second openings such that the second openings are integrated into one single structural element that is mounted to the first and second attachment element in the assembled state.

According to an embodiment, the second opening of the first attachment element is axially spaced apart from the second opening of the second attachment element, and the actuation mechanism of the base unit is at least partially arranged between the second opening of the first attachment element and the second opening of the second attachment element.

For example, the second openings may provide a hinge element for rotatably coupling the attachment unit to the actuation mechanism. In the assembled state, the first and second attachment element may together provide a fork-like structure having arms or flanges defined by the attachment elements. For example, the first attachment element may comprise an arm or flange extending from a main body of the first attachment element and second attachment element may also comprise an arm or flange extending from a main body of the second attachment element. Each arm or flange includes one of the second openings in which the actuation mechanism can be rotatably coupled.

According to an embodiment, the attachment unit comprises a connector that is mounted to both the first attachment element and the second attachment element, wherein the connector comprises two openings being configured to cooperatively receive an actuation mechanism of the base unit.

In contrast, to the above-mentioned embodiment where each of the attachment elements comprises one of the second openings, it is thus also possible to integrate the second openings in one single-piece connector which itself is attached to both attachment elements. In this case, the connector defines the fork-like structure instead of the two assembled attachment elements as described above.

According to an embodiment, the mounting interface of the first attachment element comprises at least one fastening element which fastens the first attachment element onto the outer surface of the skin section and further comprises at least one fastening element which fastens the first attachment element to the protrusion. Additionally or alternatively, the mounting interface of the second attachment element comprises at least one fastening element which fastens the second attachment element onto the outer surface of the skin section and further comprises at least one fastening element which fastens the second attachment element to the protrusion.

The at least one fastening element for each fastening can comprise multiple fastening elements. Such fastening elements may include rivets, bolts, screws, pins and/or combinations thereof. It is possible that form-fit connections or material bonds can also be applied for mounting the respective attachment element to the skin section and/or to the protrusion.

According to an embodiment, the protrusion on the outer surface of the skin section is formed by a plate-like structure that extends substantially perpendicular or exactly perpendicular from the outer surface of the skin section.

The protrusion may be a fin that protrudes from the outer surface. The fin may be part of a support structure that is covered by the skin section such that only the fin of the support structure extends through the skin section and away from the outer surface of the skin section. The fin may be fixedly arranged with respect to the skin section or may be integrally formed with the skin section. As explained above, the aerodynamic component may be a flap component, e.g., a trailing edge flap, for an aircraft wing. In this case, the fin may be oriented in a transverse direction relative to the flight direction of the aircraft. Such an orientation of the fin will be shown in the Figures described below. However, the fin can also be oriented in flight direction, i.e., parallel to the flight direction, of the aircraft. The expression "substantially perpendicular" in the present context takes into account manufacturing tolerances due to the specifically applied manufacturing technique for providing the plate-like structure at the outer surface of the skin section. Small deviations from an exactly perpendicular orientation due to the applied tools are within the scope of said expression.

The plate-like structure itself may comprise the same material as the skin section, for example a fiber reinforced material like CFRP. A metal or metal alloy can also be used. However, different materials can be used for the plate-like structure and the skin section.

According to an embodiment, the attachment unit at least partially extends over the protrusion of the aerodynamic component.

In other words, the attachment unit, when being mounted to the aerodynamic component, at least partially bridges the protrusion.

According to an embodiment, the extension of the protrusion from the aerodynamic outer surface of the skin section divides a space adjacent the skin section into a front space and a rear space, wherein the attachment unit extends over, e.g., bridges, the protrusion of the aerodynamic component such that the attachment unit is partially arranged in the front space relative to the protrusion and such that the attachment unit is partially arranged in the rear space relative to the protrusion.

In this case, the attachment unit which includes the first and second attachment elements extends and thus bridges over the protrusion from the front space to the rear space, with respect to the protrusion. The contact surfaces of the first and second attachment elements thus also extend over the protrusion. A mounting of the attachment unit to the aerodynamic component may be present in the front space, e.g., via the mounting interfaces described above, but additionally may be present in the rear space via an additional interface.

According to an embodiment, the base component is a wing structure, and the aerodynamic component is a flap structure which is movably coupled to the wing structure by the attachment unit.

The wing structure may be part of an aircraft wing and the flap structure may be part of a trailing edge flap system of the aircraft wing.

According to an aspect, an aircraft comprising a load introduction system as described herein is provided.

According to another aspect, a method for manufacturing a load introduction system is provided. A step of the method comprises providing an aerodynamic component having a skin section with an aerodynamic outer surface and a protrusion extending from the aerodynamic outer surface of the skin section. In another step, the method comprises providing a base unit having a coupling mechanism. Another step comprises manufacturing a first attachment element having a mounting interface, a contact surface and a first opening. Another step comprises manufacturing a second attachment element having a mounting interface, a contact surface and a first opening. Another step comprises assembling the first attachment element and the second attachment element such that the contact surface of the first attachment element and the contact surface of the second attachment element are in contact with each other and such that the first opening of the first attachment element and the first opening of the second attachment element coaxially align with each other. Another step comprises mounting the first attachment element to the aerodynamic component via the mounting interface of the first attachment element. Another step comprises mounting the second attachment element to the aerodynamic component via the mounting interface of the second attachment element. Another step comprises receiving the coupling mechanism of the base unit both in the first opening of the first attachment element and in the first opening of the second attachment element, thereby movably coupling the aerodynamic component to the base unit. These method steps may be performed in the indicated order.

According to an embodiment, manufacturing the first attachment element and manufacturing the second attachment element comprises milling the first attachment element and milling the second attachment element as separate parts, before assembling the first attachment element and the second attachment element.

BRIEF DESCRIPTION OF THE DRAWINGS

The present invention will hereinafter be described in conjunction with the following drawing figures, wherein like numerals denote like elements, and wherein.

DETAILED DESCRIPTION OF THE PREFERRED EMBODIMENTS

Figure 1:
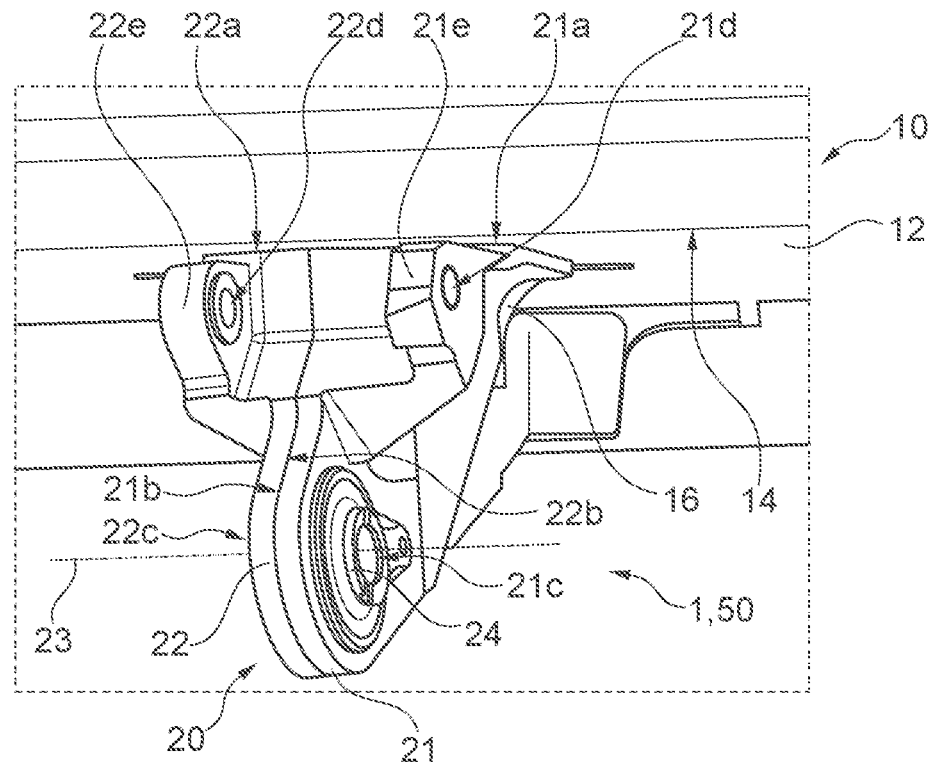
FIG. 1 shows a front perspective view of a load introduction system including an attachment unit which is divided into a first and a second attachment element.

The representations and illustrations in the drawings are schematic and not to scale. A better understanding of the method and system described above may be obtained through a review of the illustrations accompanying this application together with a review of the detailed description that follows.

FIG. 1 shows a front perspective view of a load introduction system 1 comprising an attachment unit 20 that includes two main pieces, i.e., a first attachment element 21 and a second attachment element 22, which are manufactured separately and subsequently assembled to each other. FIG. 1 shows the attachment unit 20 in the assembled state 50. The load introduction system 1 comprises an aerodynamic component 10 having a skin section 12 with an aerodynamic outer surface 14 and a protrusion 16 extending from the aerodynamic outer surface 14 of the skin section 12. The aerodynamic component 10 may have a box-like structure that is made of CFRP. For example, the aerodynamic component 10 may be a multi-cell flap component that is manufactured as a CFRP single-piece structure.

The protrusion 16 which extends from the outer surface 14 of the skin section 12 is formed by a plate-like structure, in particular a fin-like structure, that extends substantially perpendicular from the outer surface 14 of the skin section 12. The protrusion 16 may be a support structure to which the attachment unit 20 is fastened in order to transfer loads from the attachment unit 20 into the structure of the aerodynamic component 10 and vice versa. The attachment unit 20 may at least partially extend over the protrusion 16 of the aerodynamic component 10 as will be explained with reference FIGS. 2 and 3 below.

Figure 3:
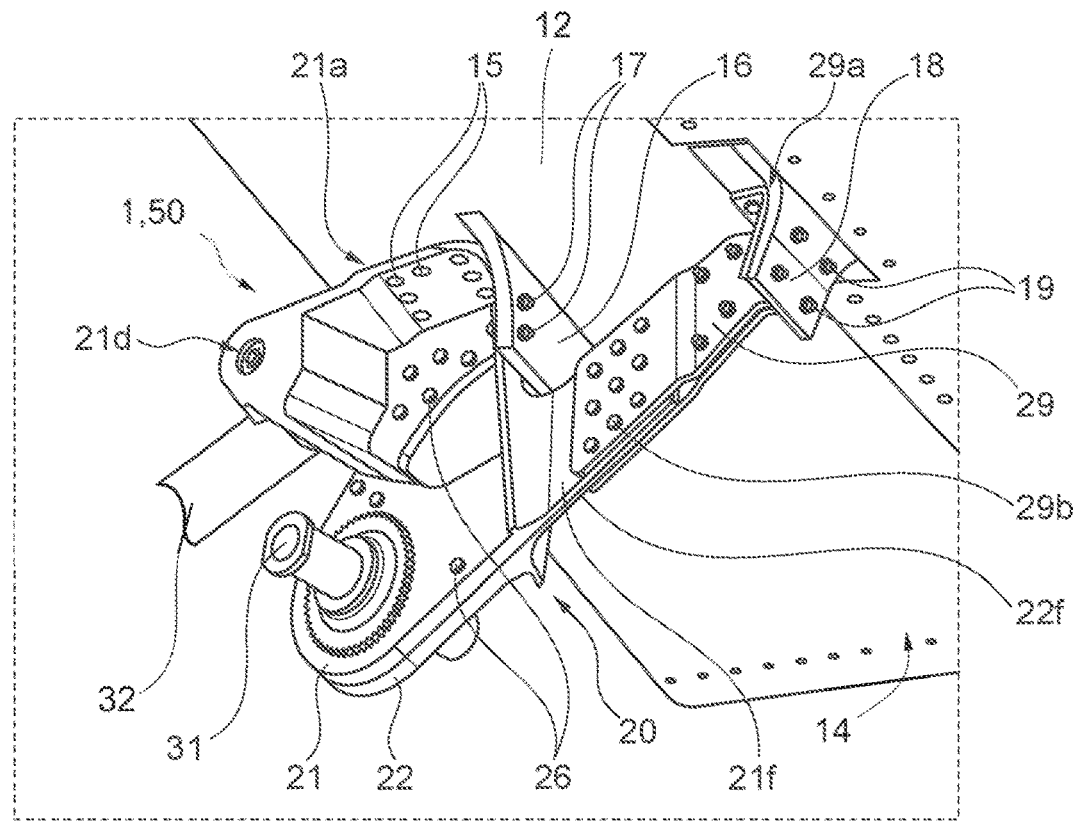
FIG. 3 shows a rear perspective view of the load introduction system of FIG. 1, with an additional indication of a coupling mechanism and an actuation mechanism.

The attachment unit 20 is adapted to movably couple the aerodynamic component 10 to a base unit (not shown in FIG. 1). As indicated above, the attachment unit 20 comprises a first attachment element 21 and a second attachment element 22, wherein the first attachment element 21 has a mounting interface 21a that is configured to mount the first attachment element 21, and thus the attachment unit 20, to the skin section 12 and to the protrusion 16 of the aerodynamic component 10. As can be seen in FIG. 3, the mounting interface 21a of the first attachment element 21 comprises at least one fastening element 15 which fastens the first attachment element 21 onto the outer surface 14 of the skin section 12 and at least one fastening element 17 which fastens the first attachment element 21 to the protrusion 16. The fastening elements may be screws, bolts, rivets, etc. However, other fastening mechanisms are possible. For example, the mounting interface 21a of the first attachment element 21 may comprise a form-fit connection or a material connection in order to attach the first attachment element 21 to the outer surface 14 and/or to the protrusion 16.

The attachment unit 20 further comprises a second attachment element 22, also having a mounting interface 22a that is configured to mount the second attachment element 22, and thus the attachment unit 20, to the skin section 12 and to the protrusion 16 of the aerodynamic component 10. As for the mounting interface 21a of the first attachment element, the mounting interface 22a of the second attachment element 22 also comprises at least one fastening element (not shown) which fastens the second attachment element 22 onto the outer surface 14 of the skin section 12 and at least one fastening element (not shown) which fastens the second attachment element 22 to the protrusion 16. The fastening elements may be screws, bolts, rivets, etc. However, other fastening mechanisms are possible. For example, the mounting interface 22a of the second attachment element 22 may comprise a form-fit connection or a material connection in order to attach the second attachment element 22 to the outer surface 14 and/or to the protrusion 16.

Furthermore, the first attachment element 21 has a contact surface 21b and the second attachment unit 22 also has a contact surface 22b. Both contact surfaces 21b, 22b are not visible in the Figures since the Figures show the assembled state 50 of the attachment unit 20 in which both surfaces are in contact with each other and overlap completely each other. The position where the contact surfaces 21b, 22b contact with each other is therefore indicated by a solid line that defines the boundary between the first attachment element 21 and the second attachment element 22.

The first attachment element 21 has a first opening 21c and the second attachment element 22 also has a first opening 22c. In the assembled state 50 of the attachment unit 20, the first opening 21c of the first attachment element 21 and the first opening 22c of the second attachment element 22 coaxially align with each other. Thus, the first opening 21c of the first attachment element 21 and the first opening 22c of the second attachment element 22 share a common central axis 23. The first openings 21c, 22c together form a lug for accommodating a bearing element 24 for receiving a coupling mechanism of the base unit. In particular, the first opening 21c of the first attachment element 21 and the first opening 22c of the second attachment element 22 cooperatively receive the coupling mechanism 31 (cf. FIG. 2) via the bearing element 24 which is arranged in the first openings 21c, 22c. Since the first attachment element 21 directly contacts the second attachment element 22, the first openings 21c, 22c are directly arranged next to each other, i.e., with no axial distance between the opening 21c, 22c.

It is noted that the first attachment element 21 is configured to provide a first load path from the first opening 21c of the first attachment element 21 to the mounting interface 21a of the first attachment element 21. Analogously, the second attachment element 22 is configured to provide a second load path from the first opening 22c of the second attachment element 22 to the mounting interface 22a of the second attachment element 22. This design in which the attachment elements 21, 22 constitute separate load transfer elements provides the advantage that the first load path through the first attachment element 21 is independent from the second load path through the second attachment element 22. A redundant load path design can thus be provided by the attachment unit 20 in the assembled state 50.

Figure 2:
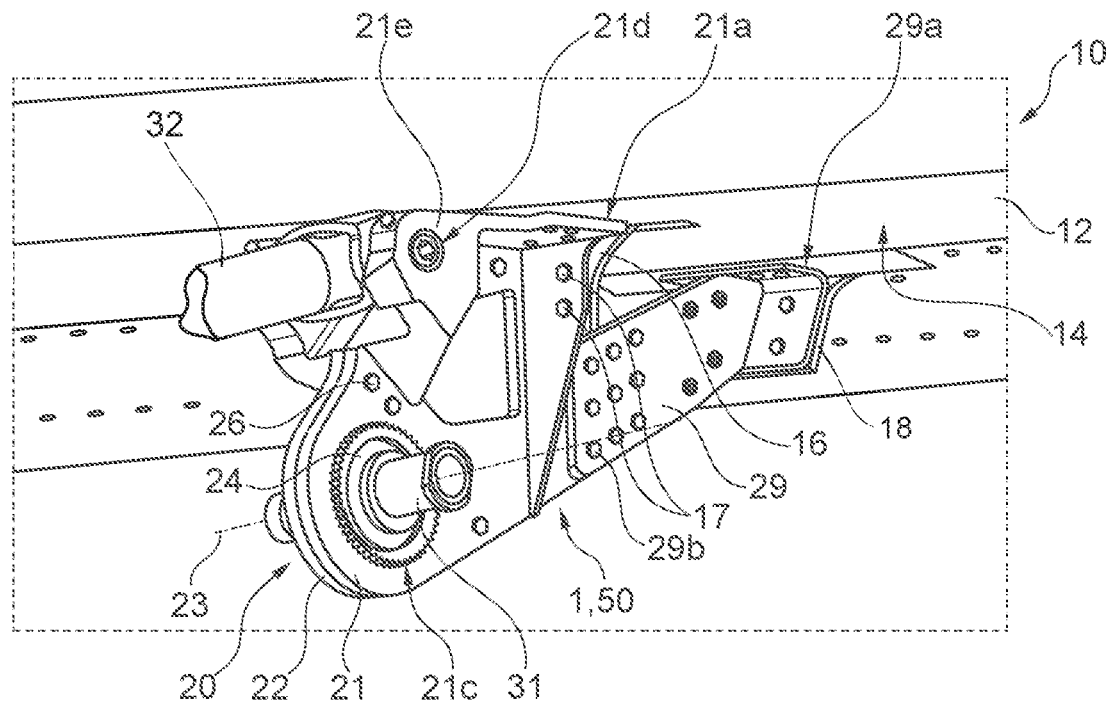
FIG. 2 shows a front perspective view of the load introduction system of FIG. 1, with an additional indication of a coupling mechanism and an actuation mechanism.

The first attachment element 21 further comprises a second opening 21d and the second attachment element 22 further comprises a second opening 22d, wherein, in the assembled state 50 of the attachment unit 20, the second opening 21d of the first attachment element 21 and the second opening 22d of the second attachment element 22 are configured to cooperatively receive an actuation mechanism 32 (cf. FIG. 2). The second opening 21d of the first attachment element 21 is axially spaced apart from the second opening 22d of the second attachment element 22 and the actuation mechanism 32 (cf. FIG. 2) is partially arranged between the second opening 21d of the first attachment element 21 and the second opening 22d of the second attachment element 22. Two arms or flange elements 21e, 22e are provided in which the second openings 21d, 22d are located. In particular, the first attachment element 21 includes an arm or flange 21e into which the second opening 21d is integrated, and the second attachment element 22 includes an arm or flange 22e into which the second opening 22d is integrated.

FIG. 2 now shows a front perspective view of the load introduction system 1 of FIG. 1, with an additional indication of the coupling mechanism 31 and the actuation mechanism 32. It is noted that only some parts of the coupling mechanism 31 and the actuation mechanism 32 are shown in FIG. 2 and that these mechanisms may comprise further parts not shown in the Figures. The coupling mechanism 31 is movably seated within the spherical bearing 24 which allows a certain degree of rotational movement of the coupling mechanism 31 inside the first openings 21c, 22c and around the central axis 23. The actuation mechanism 32 is movably seated within the second openings 21d, 22d, which allows a certain degree of rotational movement of the actuation mechanism 32 supported by second openings 21d, 22d (cf. also FIG. 1).

FIG. 2 again shows the load introduction system 1 with the outer surface 14 of the skin section 12 of the aerodynamic component 10 and the protrusion 16 extending therefrom, as well as the attachment unit 20 that comprises the first attachment element 21 and the second attachment element 22, each of which is coupled via its respective mounting interfaces 21a, 22a to the skin section 12 and to the protrusion 16 (cf. also FIG. 1).

As shown in FIG. 2, fastening elements 26 are used to mount the first attachment element 21 to the second attachment element 22, such that in the assembled state 50 both attachment elements 21, 22 are pressed against each other at their respective contact surfaces. The fastening elements 26 may include bolts, screws, rivets, etc. that extend through the structure of the first and second attachment element 21, 22. Further fastening elements 17, for example in the form of bolts, screws, rivets, etc. fasten the first and second attachment element 21, 22 to the protrusion 16.

In FIG. 2, it is also recognizable that the attachment unit 20 extends over the protrusion 16. In particular, a connection element 29 is attached to the attachment unit 20, in particular, to both attachment elements 21, 22. The attachment unit 20 can be attached to the skin section 12 and to the protrusion 16 via the connection interfaces 21a, 22a, but also via the connection element 29 to a secondary connecting region 29a on the outer surface 14 of the skin section 12. In other words, the attachment unit 20 may be attached to the skin section 12 at two separate connecting regions on the outer surface 14, wherein these connecting regions are arranged at different sides of the protrusion 16. The connection element 29 may be fastened to the skin section 12 in the connecting region 29a using fastening elements like bolts, screws, rivets, etc. The connection element 29 may additionally be fastened to another (second) protrusion 18 that, adjacent the connecting region 29a, extends from the outer surface 14 of the skin section 12. This connection to the second protrusion 18 may also include fastening elements like bolts, screws, rivets, etc. The connection element 29 may be attached to the first and second attachment element 21, 22 using fastening elements 29b, for example bolts, screws, rivets, etc.

FIG. 3 shows a rear perspective view of the load introduction system 1 of FIG. 1, with an additional indication of the coupling mechanism 31 which is movably supported with respect to the attachment unit 20 and with additional indication of the actuation mechanism 32 which is also movably supported in the second openings 21d, 22d as described above. Again, the first and second attachment unit 21, 22 are shown as being assembled, fastened and pressed against each other using the fastening elements 26. It is recognizable that further fastening elements 15 are used to fasten the first attachment element 21, via the connection interface 21a, to the skin section 12 of the aerodynamic component 10. The fastening elements 17 which fasten the first attachment element 21 to the protrusion 16 are also shown.

As can be recognized in FIG. 3, the attachment unit 20 and thus the first attachment element 21 and the second attachment element 22 extend over the protrusion 16 such that the attachment unit 20 is also attached via the connection element 29 to the skin section 12 in the connecting region 29a. The connection element 29 may be a separate component and may be attached to both attachment elements 21, 22 via fastening elements 29b, for example bolts, screws, rivets, etc. In particular, the first attachment element 21 may include a flange 21f to which the connection element 29 is attached. Accordingly, the second attachment element 22 may include a flange 22f to which the connection element 29 is also attached. The connection element 29 may include a bracket section having two arms between which the flanges 21f, 22f of the attachment elements 21, 22 are arranged when the first and second attachment element 21, 22 are fastened to the connection element 29.

As can be seen in FIG. 3, a second protrusion 18 extends from the outer surface 14 of the skin section 12. The connection element 29 may also be attached to the second protrusion 18 via fastening elements 19, for example via bolts, screws, rivets, etc. Thus, the connection element 29 may be attached to the skin section 12 at the connecting region 29a and, additionally, to the second protrusion 18. It is noted that the second protrusion 18 may also comprise a plate-like, e.g., fin-like, structure similar to the first protrusion 16.

Figure 4:
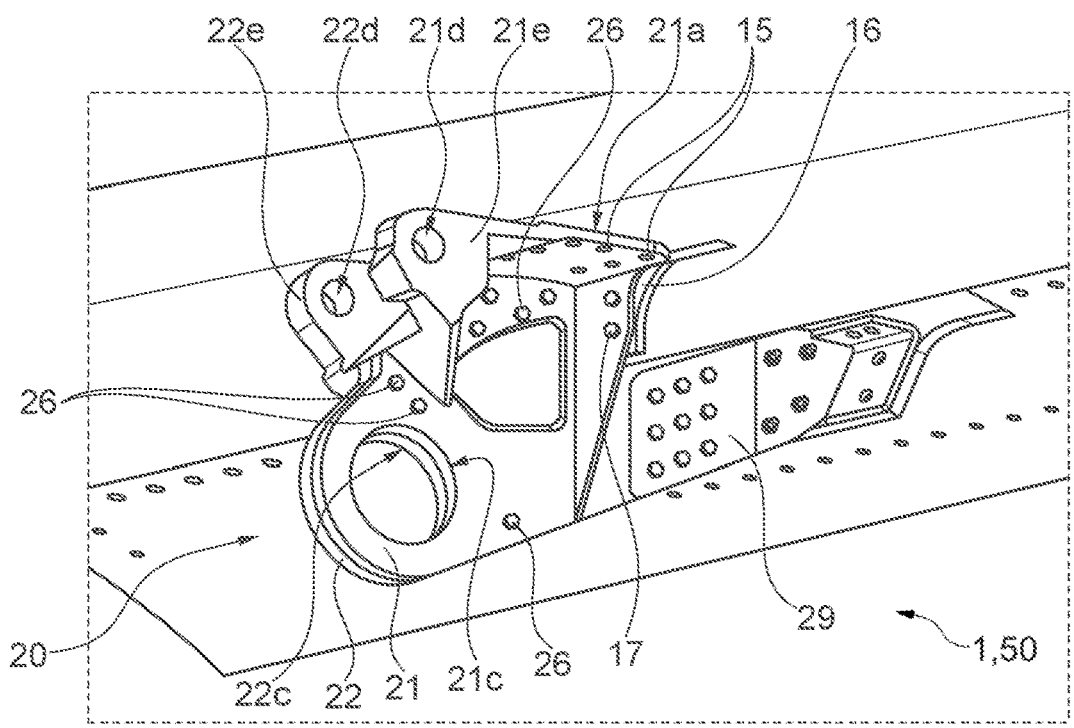
FIG. 4 shows a front perspective view of the first and second attachment elements of FIG. 1, illustrating openings integrated into the first and second attachment elements.

FIG. 4 shows a front perspective view of the first and second attachment elements 21, 22 of FIG. 1, illustrating the first openings 21c, 22c and the second openings 21d, 22d, all of which are integrated into the first and second attachment elements 21, 22. As can be clearly seen in this Figure, the second openings 21d, 22d are arranged within arms or flanges 21e, 22e of the respective attachment elements 21, 22. Again, the fastening elements 26 used for mounting the first attachment element 21 to the second attachment element 22, the fastening elements 15 for fastening the first and second attachment elements 21, 22 to the skin section 12, as well as the fastening elements 17 for fastening the first and second attachment elements 21, 22 to the protrusion 16 are shown. As described above, the connection element 29 couples the attachment elements 21, 22 to a further connecting region on the skin section 12.

From FIG. 4, it is apparent that the first openings 21c, 22c are coaxially aligned with each other. The first openings 21c, 22c are thus defined by a hole or bore that extends through the first and second attachment element 21, 22. Since the attachment elements 21, 22 directly contact each other via their contact surfaces, there is no axial distance between the two first openings 21c, 22c. Both first openings 21c, 22c rather form a single continuous hole or bore through the attachment unit 20.

Figure 5:
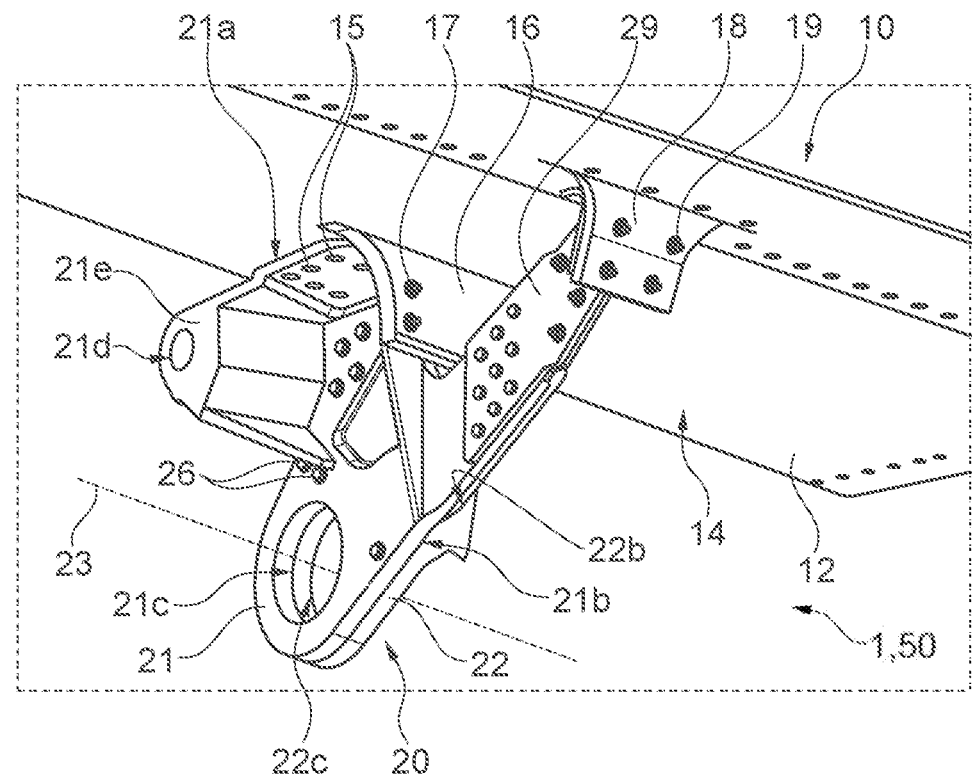
FIG. 5 shows a rear perspective view of the first and second attachment elements of FIG. 1, illustrating openings integrated into the first and second attachment elements.

FIG. 5 shows a rear perspective view of the first and second attachment elements 21, 22 of FIG. 1, illustrating the first openings 21c, 22c and one second opening 21d. As can be clearly seen in this Figure, the second opening 21d is arranged within flange 21e of the first attachment element 21. Again, the fastening elements 26 used for mounting the first attachment element 21 to the second attachment element 22, the fastening elements 15 for fastening the first and second attachment elements 21, 22 to the skin section 12, as well as the fastening elements 17 for fastening the first and second attachment elements 21, 22 to the protrusion 16 are shown. As described above, the connection element 29 couples the attachment elements 21, 22 to a further connecting region on the skin section 12. In particular, the connection element 29 couples the attachment elements 21, 22 to the second protrusion 18 via the fastening elements 19. The second protrusion 18 may be tilted relative to the first protrusion 16.

From FIG. 5, it is apparent that the first openings 21c, 22c are coaxially aligned with each other. The first openings 21c, 22c are thus defined by a hole or bore that extends through the first and second attachment element 21, 22 along the central axis 23. Since the attachment elements 21, 22 directly contact each other via their contact surfaces 21b, 22b, there is no axial distance between the two first openings 21c, 22c. Both first openings 21c, 22c rather form a single continuous hole or bore through the attachment unit 20.

Figure 6:
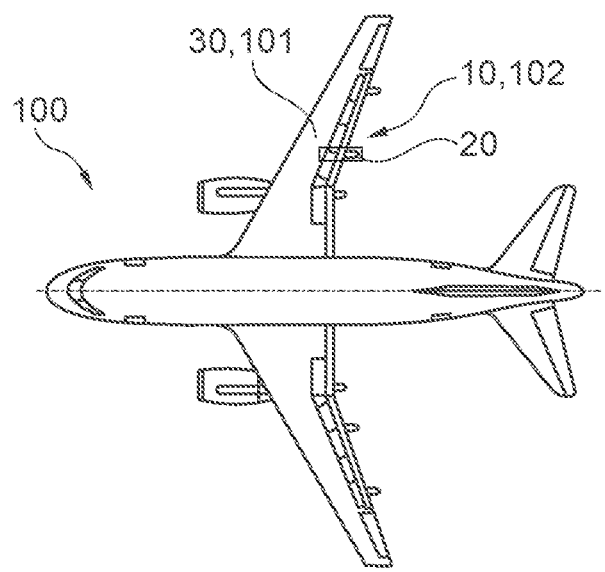
FIG. 6 shows an aircraft comprising the load introduction system of FIG. 1.

FIG. 6 shows an aircraft 100 comprising the load introduction system 1 of FIG. 1. The aerodynamic component 10 is a flap structure 102 which is movably coupled to a wing structure 101 by the attachment unit 20. In other words, the base component 30 is formed by the wing structure 101 to which the flap structure 102 is fastened via the attachment unit 20 and the coupling mechanism 31 (cf. also FIG. 2).

Figure 7:
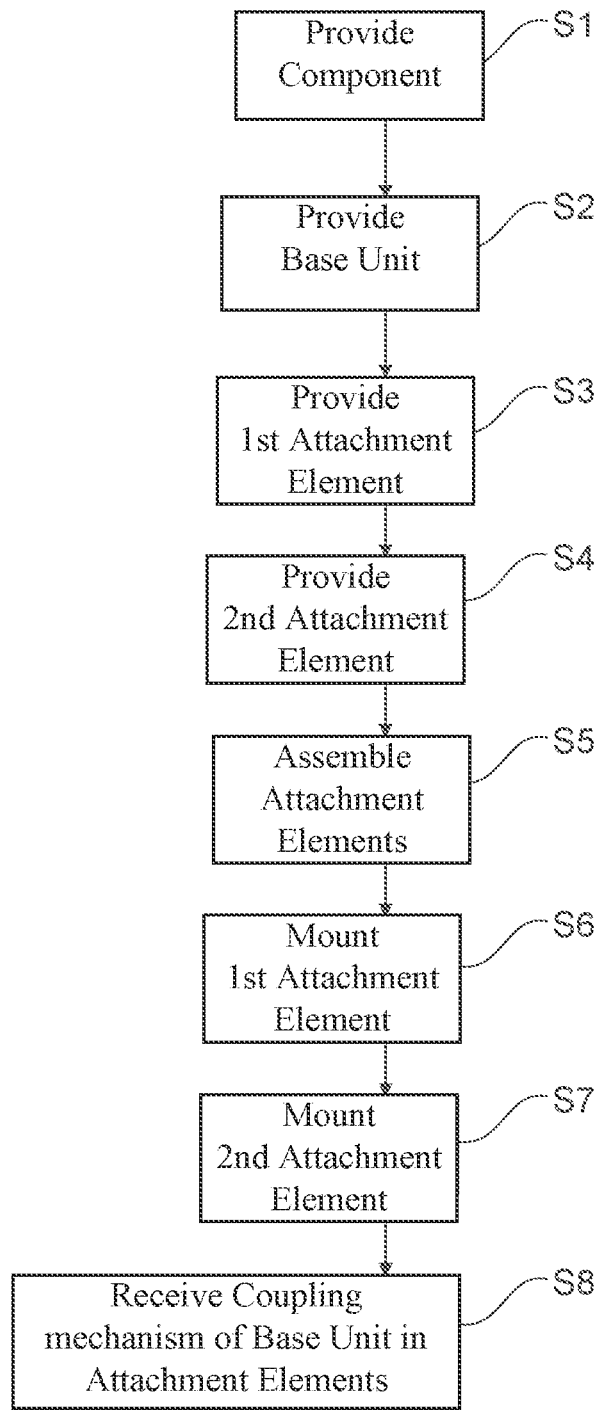
FIG. 7 shows a method for manufacturing a load introduction system.

FIG. 7 shows a method for manufacturing a load introduction system, for example the load introduction system 1 of FIG. 1 above. In a step S1 of the method, an aerodynamic component 10 having a skin section 12 with an aerodynamic outer surface 14 and a protrusion 16 extending from the aerodynamic outer surface 14 of the skin section 12 is provided. In a step S2, a base unit 30 having a coupling mechanism 31 is provided. In a step S3, a first attachment element 21 having a mounting interface 21a, a contact surface 21b and a first opening 21c is provided. In a step S4, a second attachment element 21 having a mounting interface 22a, a contact surface 22b and a first opening 22c is provided. In a step S5, the first attachment element 21 and the second attachment element 22 are assembled such that the contact surface 21b of the first attachment element 21 and the contact surface 22b of the second attachment element 22 are in contact with each other and such that the first opening 21c of the first attachment element 21 and the first opening 22c of the second attachment element 22 coaxially align with each other. In a step S6, the first attachment element 21 is mounted to the aerodynamic component 10 via the mounting interface 21a of the first attachment element 21. In a step S7, the second attachment element 22 is mounted to the aerodynamic component 10 via the mounting interface 22a of the second attachment element 22. In a step S8, the coupling mechanism 31 of the base unit 30 is received both in the first opening 21c of the first attachment element 21 and in the first opening 22c of the second attachment element 22, thereby movably coupling the aerodynamic component 10 to the base unit 30.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A load introduction system comprising:
an aerodynamic component having a skin section with an aerodynamic outer surface and a protrusion extending from the aerodynamic outer surface of the skin section;
an attachment unit for movably coupling the aerodynamic component to a base unit;
wherein the attachment unit comprises a first attachment element and a second attachment element, each of the first attachment element and the second attachment element having a mounting interface that is configured to mount the attachment unit to the skin section and to the protrusion of the aerodynamic component;
wherein each of the first attachment element and second attachment element has a contact surface;
wherein the contact surface of the first attachment element and the contact surface of the second attachment element are in contact with each other in an assembled state of the attachment unit;
wherein each of the first attachment element and the second attachment element has a first opening for receiving a coupling mechanism of the base unit;
wherein, in the assembled state of the attachment unit, the first opening of the first attachment element and the first opening of the second attachment element coaxially align with each other, such that the first opening of the first attachment element and the first opening of the second attachment element cooperatively receive the coupling mechanism of the base unit.

2. The load introduction system of claim 1,
wherein the first attachment element and the second attachment element are separately manufactured parts which are mounted together in the assembled state.

3. The load introduction system according to claim 1,
wherein the first attachment element is configured to provide a first load path from the first opening of the first attachment element to the mounting interface of the first attachment element;
wherein the second attachment element is configured to provide a second load path from the first opening of the second attachment element to the mounting interface of the second attachment element;
wherein the first load path is independent from the second load path.

4. The load introduction system according to claim 1,
wherein the first opening of the first attachment element and the first opening of the second attachment element together accommodate a bearing element for receiving the coupling mechanism of the base unit.

5. The load introduction system according to claim 1,
wherein, in the assembled state of the attachment unit, the first attachment element is mounted to the second attachment element via at least one fastening element.

6. The load introduction system according to claim 1,
wherein the first attachment element comprises a second opening;
wherein the second attachment element comprises a second opening;
wherein, in the assembled state of the attachment unit, the second opening of the first attachment element and the second opening of the second attachment element are configured to cooperatively receive an actuation mechanism of the base unit.

7. The load introduction system according to claim 6,
wherein the second opening of the first attachment element is axially spaced apart from the second opening of the second attachment element; and
wherein the actuation mechanism of the base unit is at least partially arranged between the second opening of the first attachment element and the second opening of the second attachment element.

8. The load introduction system according to claim 1,
wherein the attachment unit comprises a first arm and a second arm, the first arm mounted to the first attachment element and the second arm mounted to the second attachment element,
wherein each of the first arm and the second arm has an opening configured to cooperatively receive an actuation mechanism of the base unit.

9. The load introduction system according to claim 1,
wherein the mounting interface of the first attachment element comprises at least one fastening element which fastens the first attachment element onto the outer surface of the skin section and at least one fastening element which fastens the first attachment element to the protrusion; and/or
wherein the mounting interface of the second attachment element comprises at least one fastening element which fastens the second attachment element onto the outer surface of the skin section and at least one fastening element which fastens the second attachment element to the protrusion.

10. The load introduction system according to claim 1,
wherein the protrusion on the outer surface of the skin section is formed by a structure that extends substantially perpendicular from the outer surface of the skin section.

11. The load introduction system according to claim 1,
wherein the attachment unit at least partially extends over the protrusion of the aerodynamic component.

12. The load introduction system according to claim 1,
wherein the protrusion extends from the outer surface of the skin section and divides a space adjacent the skin section into a front space and a rear space;
wherein the attachment unit extends over the protrusion of the aerodynamic component such that the attachment unit is partially arranged in the front space relative to the protrusion and such that the attachment unit is partially arranged in the rear space relative to the protrusion.

13. The load introduction system according to claim 1,
wherein the base unit is a wing structure; and
wherein the aerodynamic component is a flap structure movably coupled to the wing structure by the attachment unit.

14. An aircraft comprising:
the load introduction system according to claim 1.

15. A method for manufacturing a load introduction system, comprising
providing an aerodynamic component having a skin section with an aerodynamic outer surface and a protrusion extending from the aerodynamic outer surface of the skin section;
providing a base unit having a coupling mechanism;
manufacturing a first attachment element having a mounting interface, a contact surface, and a first opening;
manufacturing a second attachment element having a mounting interface, a contact surface, and a first opening;
assembling the first attachment element and the second attachment element such that the contact surface of the first attachment element and the contact surface of the second attachment element are in contact with each other and such that the first opening of the first attachment element and the first opening of the second attachment element coaxially align with each other;

mounting the first attachment element to the skin section and to the protrusion of the aerodynamic component via the mounting interface of the first attachment element;

mounting the second attachment element to the skin section and to the protrusion of the aerodynamic component via the mounting interface of the second attachment element;

receiving the coupling mechanism of the base unit both in the first opening of the first attachment element and in the first opening of the second attachment element, thereby movably coupling the aerodynamic component to the base unit.

* * * * *